United States Patent [10] Patent No.: US 12,372,777 B2
Charton et al. (45) Date of Patent: Jul. 29, 2025

(54) ADAPTIVE OPTICAL SYSTEM WITH IMPROVED RESPONSE TIME, RELATED USE AND METHOD

(71) Applicant: ALPAO, Montbonnot-Saint-Martin (FR)

(72) Inventors: Julien Gérard Ernest Charton, Lumbin (FR); Vincent Olivier Hardy, Saint Martin d'Uriage (FR)

(73) Assignee: ALPAO, Montbonnot-Saint-Martin (FR)

( * ) Notice: Subject to any disclaimer, the term of this patent is extended or adjusted under 35 U.S.C. 154(b) by 675 days.

(21) Appl. No.: 17/781,998

(22) PCT Filed: Nov. 30, 2020

(86) PCT No.: PCT/FR2020/052224
§ 371 (c)(1),
(2) Date: Jun. 2, 2022

(87) PCT Pub. No.: WO2021/111068
PCT Pub. Date: Jun. 10, 2021

(65) Prior Publication Data
US 2023/0003995 A1   Jan. 5, 2023

(30) Foreign Application Priority Data
Dec. 4, 2019  (FR) .................................. FR1913769

(51) Int. Cl.
*G02B 26/06* (2006.01)
*G02B 5/10* (2006.01)
*G02B 7/185* (2021.01)

(52) U.S. Cl.
CPC ............... *G02B 26/06* (2013.01); *G02B 5/10* (2013.01); *G02B 7/185* (2013.01)

(58) Field of Classification Search
None
See application file for complete search history.

(56) References Cited

FOREIGN PATENT DOCUMENTS

FR        2751760 A1    1/1998
WO   2019/129949 A1    7/2019

OTHER PUBLICATIONS

Davies, et al., "Adaptive Optics for Astronomy" arxiv.org, Cornell University Library, 201 Olin Library Cornell University Ithaca, NY 14853, Jan. 2012.

*Primary Examiner* — Robert E. Tallman
(74) *Attorney, Agent, or Firm* — Nath, Goldberg & Meyer; Joshua B. Goldberg (57) ABSTRACT

The invention relates to an adaptive optical system (1) comprising: an adaptive optical device (2) comprising an optical processing surface (3) and a driving device (5) for controllably modifying the optical behaviour of said optical processing surface (3), an optical analyser (6) intended to be subjected to an input light beam (7) in order to produce, in response, output signals (8, 9, 10), a control device (11) connected to the optical analyser (6) and to the driving device (5) in order to command the latter depending on said output signals (8, 9, 10), characterised in that said optical analyser (6) is designed to spatially demultiplex, via multiplane light conversion, the input light beams (7) into a plurality of elementary output light beams (80, 90, 100). Adaptive optical systems.

23 Claims, 4 Drawing Sheets

ADAPTIVE OPTICAL SYSTEM WITH IMPROVED RESPONSE TIME, RELATED USE AND METHOD

This is a National Phase Application filed under 35 U.S.C. 371 as a national stage of PCT/FR2020/052224, filed Nov. 30, 2020, an application claiming the benefit of French Application No. FR1913769, filed Dec. 4, 2019, the content of each of which is hereby incorporated by reference in its entirety.

TECHNICAL FIELD

The present invention relates to the general technical field of adaptive optics, for applications as diverse as:
- correction of atmospheric disturbances or turbulences, for example, for applications in astronomy, near space observation, satellite imaging and/or communications, in telecommunications, in particular by means of FSO (Free Space Optics) equipment, or also for military applications,
- medicine, in particular ophthalmology,
- laser use, microscopy,
- microelectronics,
- telecommunications,
- fiber-optics injection, this list being not limitative.

PRIOR ART

The present invention more particularly relates to an adaptive optical system including:
- an adaptive optical device comprising an optical processing surface intended to deform an incident wavefront and a driving device connected to said optical processing surface to controllably modify the optical behaviour of said optical processing surface,
- an optical analyser intended to be subjected to an input light beam in order to produce, in response, output signals,
- and a control device connected, on the one hand, to the optical analyser, and on the other hand, to the driving device, in order to command the latter as a function of said output signals.

The present invention also relates to the use of an optical analyser designed to spatially demultiplex, by multi-plane light conversion, an input light beam into a plurality of elementary output light beams each corresponding to an isolated spatial mode or to a group of isolated spatial modes.

The present invention finally relates to a method for driving an adaptive optical device comprising an optical processing surface intended to deform an incident wavefront and a driving device connected to said optical processing surface to controllably modify the optical behaviour of said optical processing surface, said method comprising a step of subjecting an optical analyser to an input light beam to produce in response output signals, as well as a step of commanding the driving device as a function of said output signals.

The adaptive optical systems are well known as such. They allow generating or correcting in a dynamic and controlled manner optical aberrations in an incident wavefront. Multiple applications exist for such adaptive optical systems. It is known in particular to use, in order to correct a disturbed wavefront, a closed-loop adaptive optical system that usually includes a wavefront analyser, a calculator and a wavefront corrector that is for example in the form of a deformable mirror. Such a closed-loop adaptive optical system is for example particularly useful in astronomy, to compensate for the disturbances that the light has undergone, in particular when passing through the atmosphere. In this particular example, the deformable mirror is subjected to a light flow coming from a telescope pointed at the area to be observed (which includes for example a star). The incident light flow reflects on the deformable mirror and is sent back, as a reflected light flow, to a splitter plate that splits the reflected light beam into, on the one hand, an observation beam that is directed towards an image acquisition means and, on the other hand, a feedback light beam that illuminates the wavefront analyser, which makes it possible to identify the wavefront shape and provides this information to the calculator.

In response, the calculator itself commands an array of actuators controlling the deformation of the deformable mirror.

These known adaptive optical systems are generally satisfactory but have nevertheless various drawbacks relating in particular to their relative slowness, their less than optimal degree of reliability, their cost and their bulk.

These drawbacks come in particular from the fact that the known wavefront analysers generally used in the adaptive optical systems include an image array sensor (CCD or CMOS, for example) associated with optical elements (micro-lens array, pyramid, etc.) coding the wavefront phase into intensity variations measurable by the image array sensor (spots, fringes, etc.). Now, the image array sensors are expensive and complex, especially when they need to be fast and sensitive.

These image array sensors further include a high number of pixels. The time required to convert the photons into a digital signal, to transfer the signal to the calculator and to process the pixels in the calculator is long. On fast systems, this latency is the main factor limiting the performance. In particular, in sectors of activity such as astronomy, it is possible that the atmospheric disturbances that disturb the wavefront occur at a speed that exceeds the speeds of calculation of the conventional adaptive optical systems implementing a conventional wavefront analyser. In such a case, an optimum processing of the image is impossible.

Moreover, the image array sensors implemented in the known systems do not measure directly the wavefront, but the gradient thereof. The calculator must therefore perform a large number of operations in order to create the command signal required by the wavefront corrector (deformable mirror). This is again a source of cost and loss of time. This relative slowness of the known devices may be extremely damaging in applications in which the speed of correction is critical (satellite or debris imaging, for example). Moreover, in such conventional adaptive optical systems, a significant part of the photons is redundant, lost or underused at the wavefront analyser, precisely because of the use of image array sensors, in such a way that part of the information contained in the light signal is itself redundant, lost or underused, which constitutes a serious drawback, in particular when the useful signal is weak.

Finally, the wavefront analysers implemented in the known adaptive optical systems prove to be in practice relatively bulky and fragile.

DISCLOSURE OF THE INVENTION

The objects assigned to the present invention therefore aim to remedy the different drawbacks mentioned hereinabove, and to propose a new adaptive optical system that is particularly fast, lightweight, robust and cheap.

Another object of the invention aims to propose a new adaptive optical system that is particularly compact.

Another object of the invention aims to propose a new adaptive optical system that is particularly reliable.

Another object of the invention aims to propose a new adaptive optical system that is particularly resistant to untimely mechanical stresses, such as shocks or vibrations.

Another object of the invention aims to propose a new adaptive optical system that is particularly simple and fast to manufacture.

Another object of the invention aims to propose a new adaptive optical system having a universal architecture that lends itself to a variety of optical applications and arrangements, both closed and open loop.

Another object of the invention aims to propose a new adaptive optical system whose design makes it possible to minimize the required power of the electronic calculation means, or even, in certain cases, to free from such calculation means.

Another object of the invention aims to propose a new adaptive optical system whose performance, and in particular the correction bandwidth, is not limited by the performance of the wavefront analyser or the calculator.

Another object of the invention aims to propose a new adaptive optical system that is particularly accurate and of extremely simplified and lightweight construction.

Another object of the invention aims to propose a new adaptive optical system that is easy and fast to maintain and adjust.

Another object of the invention aims to propose a new adaptive optical system that implements simple, lightweight, robust and cheap components.

Another object of the invention aims to propose a new adaptive optical system whose setting is particularly easy and fast.

Another object of the invention aims to propose a new use of a demultiplexer implementing a multi-plane light conversion, which makes it possible to obtain a new adaptive optical system that is particularly fast, reliable, compact, lightweight and robust.

Another object of the invention aims to propose a new method of driving an adaptive optical device that allows a dynamic adjustment of the optical behaviour of the optical processing surface of said adaptive optical device at a particularly height speed and in a particularly reliable manner.

The objects assigned to, the invention are achieved by means of an adaptive optical system including:
- an adaptive optical device comprising an optical processing surface intended to deform an incident wavefront and a driving device connected to said optical processing surface to controllably modify the optical behaviour of said optical processing surface,
- an optical analyser intended to be subjected to an input light beam in order to produce, in response, output signals,
- a control device connected, on the one hand, to the optical analyser, and on the other hand, to the driving device, in order to command the latter as a function of said output signals,
- characterized in that said optical analyser is designed to spatially demultiplex, by multi-plane light conversion, the input light beam into a plurality of elementary output light beams each corresponding to an isolated spatial mode or to a group of isolated spatial modes, said output signals being formed by, or from, said elementary light beams.

The objects assigned to the invention are also achieved by means of the use of an optical analyser designed to spatially demultiplex, by multi-plane light conversion, an input light beam into a plurality of elementary output light beams each corresponding to an isolated spatial mode or to a group of isolated spatial modes, to provide signals for driving the modification of optical behaviour of an optical processing surface of an adaptive optical device intended to controllably deform an incident wavefront.

The objects assigned to the invention are finally also achieved by means of a method for driving an adaptive optical device comprising an optical processing surface intended to deform an incident wavefront and a driving device connected to said optical processing surface to controllably modify the optical behaviour of said optical processing surface, said method comprising a step of subjecting an optical analyser to an input light beam in order to produce, in response, output signals, as well as a step of commanding the driving device as a function of said output signals, said method being characterized in that said optical analyser spatially demultiplex, by multi-plane light conversion, the input light beam into a plurality of elementary output light beams each corresponding to an isolated spatial mode or to a group of isolated spatial modes, said output signals being formed by, or from, said elementary light beams.

BRIEF DESCRIPTION OF THE DRAWINGS

Other features and advantages of the invention will appear in more detail upon reading of the following description, with reference to the appended drawings, given by way of purely illustrative and non-limiting examples, in which.

WAYS TO IMPLEMENT THE INVENTION

According to a first embodiment, the invention relates to an adaptive optical system 1 intended, for example, to introduce or to correct, preferably continuously, an optical aberration in a wavefront. In a particular embodiment, which corresponds to the example illustrated in FIG. 1, the adaptive optical system 1 is designed to correct in real time, in a dynamic and controlled manner, the evolutive and unpredictable deformations of a wavefront 4, said deformations resulting for example from atmospheric disturbances and/or turbulences. Such a system is particularly suitable for applications such as, for example:

astronomical observation,
near space observation,
satellite imaging,
satellite telecommunications,
communications using FSO (Free Space Optics) equipment,
certain military applications,
for which the speed of correction is a critical parameter.

The invention is however not limited to the above-mentioned specific applications and the adaptive optical system 1 according to the invention may be used for multiple applications or be, for example, included into, or form, a microscopic observation system, or an image enlargement or reduction system, or a zoom system, or an image deformation system, or an ophthalmological imaging system, or a terrestrial telecommunication system, or a fiber-optics injection system . . . this list being not limitative.

Figure 1:
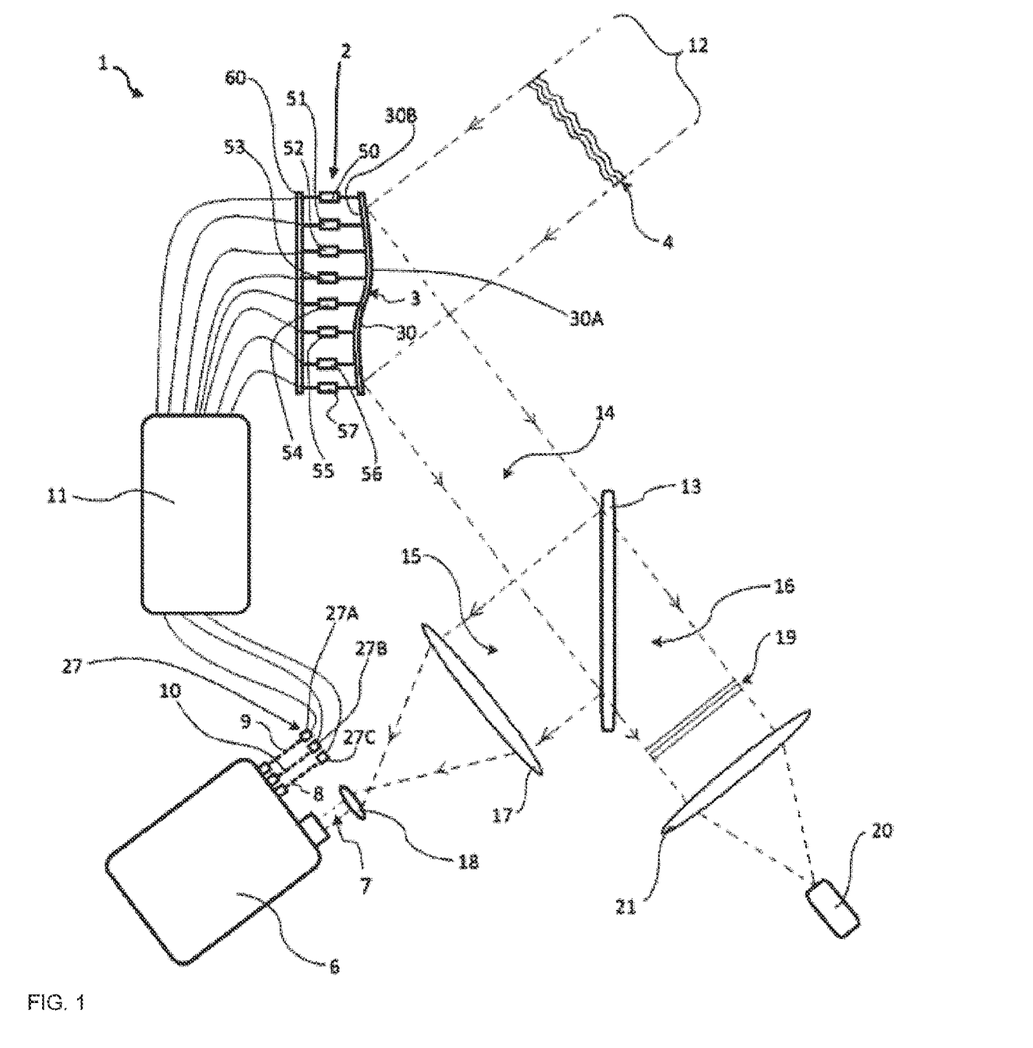
FIG. 1 schematically illustrates an exemplary embodiment of an adaptive optical system according to the invention, which implements a deformable mirror as an adaptive optical device, to correct in real time a disturbed incident wavefront.

The adaptive optical system 1 includes, as illustrated in FIG. 1, an adaptive optical device 2 comprising an optical processing surface 3 intended to deform an incident wavefront 4. The incident wavefront 4 is for example a disturbed wavefront, which is deformed due to disturbances caused by the passing through the Earth's atmosphere. The adaptive optical device 2 is advantageously an active device that aims to compensate, preferably exactly, in real time and in a dynamic and continuous manner, for the disturbance that deforms the incident wavefront 4. The adaptive optical device 2 also comprises a driving device 5 connected to the optical processing surface 3 to controllably modify the optical behaviour of said optical processing surface, preferably in a dynamic (modifiable) manner and advantageously in real time. The adaptive optical device 2 is thus an active device, which acts preferably permanently, in a continuous and controlled manner, to deform the incident wavefront 4 in order to advantageously correct the latter.

Advantageously, the adaptive optical device 2 is an active wavefront correction device designed to ensure a phase correction (for example in the form of phase delay introduction) in order to modify the shape of the wavefront 4 (for example to restore the flatness thereof).

For that purpose, the adaptive optical device 2 is for example designed to dynamically modify the spatial distribution of the refractive index of the optical processing surface 3. In this case, the optical processing surface 3 is for example consisted of a liquid crystal panel such as an LCD screen. The driving device 5 is advantageously formed in this case by a microcontroller that drives the liquid crystal array forming the optical processing surface 3, in such a way as to modify dynamically the spatial distribution of the refractive index within the liquid crystal array (by colour change). The incident wavefront 4 thus passes through the liquid crystal array forming in this case the optical processing surface 3, which causes the deformation of the wavefront due to phase delays introduced locally by the liquid crystal array. In this embodiment, the modification of the optical behaviour of the optical processing surface 3 consists in a modification of the spatial distribution of the refractive index of the material forming the optical processing surface 3, to introduce locally an optical path difference.

As an alternative (and as illustrated in the Figures), the adaptive optical device 2 is for example designed to dynamically modify the geometry of the optical processing surface 3. In this case, the optical processing surface 3 is for example consisted by a deformable surface as illustrated in the Figures. The driving device 5 is advantageously formed in this case by one or several actuators (preferably an array of actuators) connected to the deformable surface forming the optical processing surface 3, to controllably deform the latter. In this embodiment, the modification of the optical behaviour of the optical processing surface 3 therefore consists in a deformation of the optical processing surface 3, to vary the spatial distribution of the geometrical path.

To sum up, the adaptive optical device 2 advantageously comprises an optical processing surface 3 intended to deform an incident wavefront 4 and a driving device 5 connected to said surface 3 either to controllably deform the latter (deformable mirror or adaptive lens, for example), or to controllably modify the spatial distribution of the refractive index within the surface 3 (liquid-crystal wavefront corrector, for example).

In the embodiment illustrated in the figures, the adaptive optical device 2 is a deformable mirror provided with a deformable reflective surface forming said optical processing surface 3. The invention is however not limited to the implementation, as an adaptive optical device 2, of a deformable mirror. As an alternative, the adaptive optical device 2 can be an adaptive lens, designed to refract a dynamic wavefront, in order for example, to introduce or correct an optical aberration in the wavefront in question. Hereinafter, for the sake of brevity, it will be referred only to an adaptive optical device 2 consisted by a deformable mirror, it being understood that the invention is however not limited to this particular embodiment and can as an alternative implement, as exposed hereinabove, an adaptive lens or liquid crystal array instead of the deformable mirror described hereinafter by way of non-limitative example.

The adaptive optical system 1 also includes an optical analyser 6 intended to be subjected to an input light beam 7 in order to produce, in response, output signals 8, 9, 10. The optical analyser 6 advantageously acts as a wavefront analyser aiming to provide the system with information about the wavefront shape useful to drive the optical behaviour of the optical processing surface 3 and, for example, to drive the deformation of the deformable surface forming the optical processing surface 3 according to the embodiment illustrated in the Figures.

The adaptive optical system 1 also includes a control device 11 connected, on the one hand, to the optical analyser 6, and on the other hand, to the driving device 5, in order to command the latter as a function said output signals 8, 9, 10. The driving device 5 advantageously comprises a plurality of actuators 50, 51, 52, 53, 54, 55, 56, 57, spaced apart from each other and connected to the deformable surface advantageously forming the surface 3 by any known means, to each locally exert on the surface 3 an external deformation force on the surface 3. Said actuators 50, 51, 52, 53, 54, 55, 56, 57 may be of any known type, and for example be formed of piezoelectric, magnetic, two-part, mechanical, screw actuators, etc. The control device 11 advantageously provides each actuator with a respective electrical command signal that depends on said output signals 8, 9, 10. The control device 11 thus commands individually and simultaneously the actuators 50, 51, 52, 53, 54, 55, 56, 57 to permanently adapt the profile of the deformable surface advantageously forming the optical processing surface 3 as a function of the output signals 8, 9, 10 provided by the optical analyser 6 in response to the input light beam 7.

In the embodiment illustrated in FIG. 1, the adaptive optical system 1 operates in closed feedback loop, which allows adapting permanently the profile of the deformable surface advantageously forming the optical processing surface 3 thanks to the output signals 8, 9, 10 provided by the analyser 6. It is however perfectly conceivable, according to an alternative embodiment, that the adaptive optical system 1 operates in open loop.

Advantageously, and as illustrated in FIG. 1, the adaptive optical system 1 comprises a beam splitter 13 arranged with respect to the adaptive optical device 2 and the optical analyser 6 in such a way that an incident light beam 12 (coming for example from a telescope), which is characterized by the incident wave profile 4, is reflected and/or refracted by the optical processing surface 3 of the adaptive optical device 2, to form a modified light beam 14 sent back on said beam splitter 13. The latter separates the modified light beam 14 into a first beam 15 and a second beam 16. The beam splitter 13 may be advantageously formed by a semi-reflective plate, which splits the modified light beam 14 into two light flows, a reflected one (corresponding to the first beam 15 in the example illustrated in FIG. 1), and a refracted one (corresponding, in the example of FIG. 1, to the second beam 16 to be exploited). The invention is however absolutely not limited to this particular embodiment and any other arrangement of adaptive optics may be implemented, without thereby departing from the scope of the invention.

The first beam 15 forms the input light beam 7, either directly or indirectly, by processing using for example an optical device. The optical device in question comprises for example one or several lenses 17, 18 that process the first light beam 15 in such a way that the latter forms the input light beam 7 exploitable by the optical analyser 6. In the specific embodiment illustrated in FIG. 1, the lenses 17, 18 are arranged in a telescope-like series arrangement, with for example the lens 17 that ensures a convergence of the first beam 15, whereas the lens 18 is a collimation lens that allows obtaining as an output a collimated light beam forming the input light beam 7. The invention is however not limited to this particular embodiment, and any other means for processing or transforming the first beam 15 may be implemented, or conversely no means at all if the optical analyser 6 is directly subjected to the first beam 15 that then forms directly the input light beam 7.

The second beam 16 constitutes for its part a second beam 16 to be exploited by the user of the adaptive optical system 1. This second beam 16, whose wavefront 19 has been rectified by the adaptive optical device 2, is for example captured by an imaging device 20, which then benefits from a clear image since the untimely deformations of the incident wavefront 4 have been compensated for by the deformation of the deformable reflective surface advantageously forming the optical processing surface 3 of the adaptive optical device 2 (consisted in the example illustrated by a deformable mirror). In the embodiment illustrated in the Figures, the second beam 16 passes for example through a lens 21 that makes it converge to the sensor(s) of the imaging device 20. This arrangement is obviously a purely illustrative and non-limiting example.

Advantageously, the beam splitter 13 is chromatic, in such a way that said first beam 15 is formed by a radiation whose spectral band is different from that of the radiation forming the second beam 16. This makes it possible to use for the optical analyser 6 a spectral band that is less useful for the application concerned.

According to an important characteristic of the invention, the optical analyser 6 is designed to spatially demultiplex, by multi-plane light conversion, the input light beam 7 into a plurality of elementary output light beams 80, 90, 100, each corresponding to an isolated spatial mode or to a group of isolated spatial modes, said output signals 8, 9, 10 being formed by, or from, said elementary light beams 80, 90, 100.

Therefore, the optical analyser 6 does not rely on a sampling of the wavefront, for example by means of a micro-lens frame and an CCD camera, as in the prior art, but on a decomposition of the input light beam 7 (whose wavefront is potentially disturbed according to a plurality of different modes of deformation) into a plurality of elementary output light beams 80, 90, 100, distinct and separated from each other, each output light beam 80, 90, 100 corresponding to a single modal mode, or possibly to a group of spatial modes, for example groups of spatial modes of the same radial or azimuthal order.

In other words, the invention is based on a perfectly original principle of wavefront analysis advantageously consisting in physically decomposing the input light beam, which is affected by different aberrations (or deformation modes, or Zernike modes) into a series of elementary light beams 80, 90, 100 each corresponding to an elementary aberration (or Zernike mode), or a group of aberrations (or Zernike modes) of the same order.

This spatial demultiplexing is performed by a multi-plane light conversion method, which is known as such and described for example in the article entitled "Programmable unitary spatial mode manipulation" (Morizur et al., J. Opt. Soc. Am. A/vol. 27, No. 11/November 2010: 2524-2531), or for example in the U.S. Pat. Nos. 9,250,454 and 10,324,286, the content of which is incorporated by way of reference. The multi-plane light conversion method, also called "MPLC", is a technique based on the decomposition of a unitary spatial transformation into a succession of primary transformations affecting the transverse phase profile of the light radiation. Based on this principle, it is possible to spatially multiplex or demultiplex a light beam. Within the framework of the invention, the multi-plane light conversion technique is advantageously used to demultiplex the light beam in order to thus provide a command signal to the control device 11. One of the major interests in using an optical analyser 6 implementing a spatial demultiplexing by multi-plane light conversion lies in the fact that such a multi-plane light conversion may be implemented using fully passive components, which provides the optical analyser 6 with a particularly reliable and robust nature, as well as a particularly short response time.

The spatial demultiplexing by multi-plane light conversion implemented within the framework of the invention may be performed using any known means, and in particular using means described in the following documents, whose content is incorporated herein by way of reference:

WO-2012/085046,
WO-2017/158262,
WO-2017/158261,
WO-2019/155085,
WO-2019/129954,
WO-2019/129949,
WO-2019/162637,
Damien Gatinel thesis paper "Une nouvelle méthode de décomposition polynomiale d'un front d'onde oculaire", Organes des sens. Université Paris-Saclay, 2017.NNT: 2017SACLV042. tel-01617820. HAL Id: tel-01617820; https://tel.archives-ouvertes.fr/tel-01617820;
Philippe Genevaux thesis paper "Le multiplexage de mode spatial pour augmenter le débit dans les fibres optiques" Optique [physics.optics]. Université Pierre et Marie Curie—Paris VI, 2016. Français. NNT: 2016PA066336. HAL Id: tel-01470296 https://tel.archives-ouvertes.fr/tel-01470296;

the article "Design of high order mode-multiplexers using multiplane light conversion" by N. K. Fontaine et al., presented at the 43rd European Conference on Optical Communications 2017 (ECOC, 2017), DOI: 10.1109/ECOC.2017.8346129;

the article "Characterization and applications of spatial mode multiplexers based on Multi-Plane Light Conversion" by Guillaume Labroille, Nicolas Barré, Olivier Pinel, Bertrand Denolle, Kevin Lenglé, Lionel Garcia, Lionel Jaffrès, Pu Jian, Jean-François Morizur—Optical Fiber Technology, Volume 35, February 2017, pages 93-99, https://doi.org/10.1016/j.yofte.2016.09.005;

the article by G. Labroille, P. Jian, N. Barré, B. Denolle and J-F. Morizur, "Mode selective 10-mode multiplexer based on multi-plane light conversion", Optical Fiber Communication Conference—OSA Technical Digest (online)—Optical Society of America, 2016, paper Th3E.5—https://doi.org/10.1364/OFC.2016.Th3E.5;

the article by G. LABROILLE et al., "efficient and mode selective spatial mode multiplexers based on multi-plane light conversion", Optics Express Jun. 30, 2014, volume 22, number 13, page 15 599;

the article "Fabrication and Characterization of a Mode-selective 45-Mode Spatial Multiplexer based on Multi-Plane Light Conversion" by Satyanarayana Bade, Bertrand Denolle, Gauthier Trunet, David Allioux, Pu Jian, Olivier Pinel, Guillaume Labroille, presented at the Optical Fiber Communications Conference and Exposition (OFC) 2018—INSPEC Accession Number: 17856001—updated Version V3: arXiv:1803.07907v3 [physics. app-ph].

Particularly preferentially and according to the embodiment illustrated in the Figures, the optical analyser 6 comprises a multi-pass cavity 22 delimited by first and second reflective elements 23, 24 on each of which said input light beam 7 is intended to reflect a plurality of times at a plurality of different reflection locations 220, 221, 222, 223, 224, 225, 226, 227, 228, 229, 230, at least certain of said reflection locations 220, 221, 222, 223, 224, 225, 226, 227, 228, 229, 230 each being provided with a phase modification element 25, to modify the spatial phase of the light beam. The multi-pass cavity 22 is thus formed by the first and second reflective elements 23, 24 arranged opposite each other, at a distance from each other (cf. FIG. 2), in such a way that the input light beam 7 undergoes a succession of reflections each followed by a propagation in free space (not guided), the phase modification elements 25 present at the reflection locations 220-230 inducing a local phase-shift within the cross-section of the beam. The light beam 7 thus undergoes, within the multi-pass cavity 22, a succession of elementary spatial transformations of the light ray phase according to a determined spatial profile that makes it possible to obtain a demultiplexing of the initial beam 7 leading in obtaining at the exit of the cavity 22 a plurality of light beams forming said elementary output beams 80, 90, 100. By way of simplicity and conciseness, the example of the Figures illustrates a decomposition into three elementary output light beams 80, 90, 100 each corresponding to an elementary deformation mode (for example, a Zernike mode). The invention is of course not limited to this particular number, and the input beam 7 can be decomposed into a number of elementary output light beams lower than 3 (for example 2) or preferably far higher than 3 (for example 6, 8, 10 or several dozens).

Particularly advantageously, the principle and operation of the optical analyser 6 implemented within the framework of the invention rely on the principle exposed in document WO-2019/129949 (in which the spatial demultiplexing is for example taught page 13, line 27 to 33) and/or in the above-mentioned article "Fabrication and Characterization of a Mode-selective 45-Mode Spatial Multiplexer based on Multi-Plane Light Conversion" by Satyanarayana Bade, Bertrand Denolle, Gauthier Trunet, David Allioux, Pu Jian, Olivier Pinel, Guillaume Labroille, presented at the Optical Fiber Communications Conference and Exposition (OFC) 2018—INSPEC Accession Number: 17856001—referenced updated Version V3: arXiv:1803.07907v3 [physics.app-ph].

The use of a multi-pass cavity 22 implementing reflective phase modification elements 25 makes it possible to obtain a particularly compact, lightweight and robust optical analyser 6. As an alternative, it is perfectly possible to use transmissive phase modification elements without thereby departing from the scope of the invention.

Advantageously, the phase modification elements 25 are formed by a passive phase-shift structure whose conformation is fixed. In other words, the phase-shift structure forming the phase modification elements 25 has a fixed, non-evolutive conformation, which allows providing excellent robustness and reliability to the optical analyser 6. It is however perfectly conceivable that the phase-shift structure is rather of active nature and composed for example of an array of variable-orientation micro-mirrors, without that way departing from the scope if the invention.

Advantageously, said first and second reflective elements 23, 24 are themselves fixed and passive, which here again makes it possible to provide reliability and robustness to the optical analyser 6.

Figure 2:
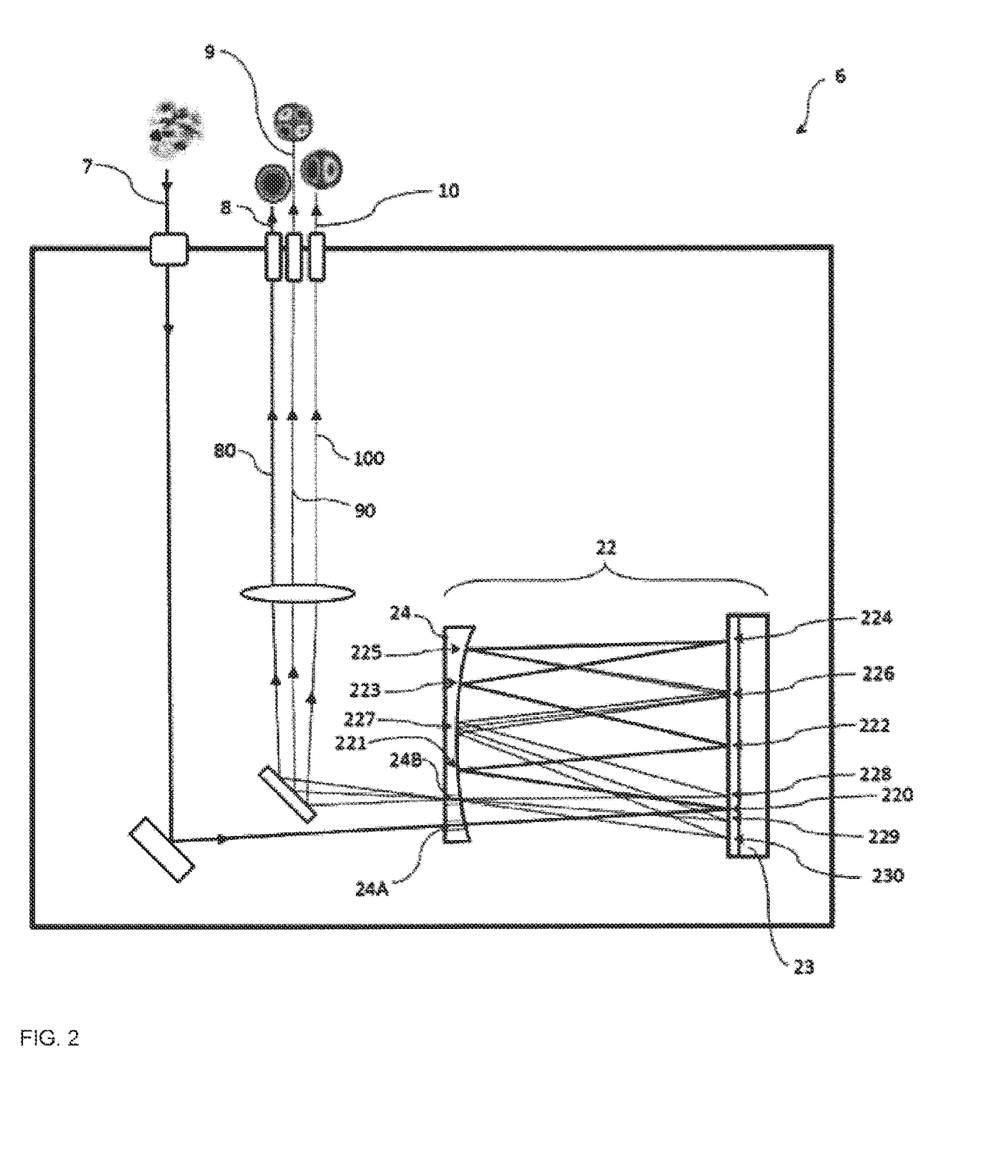
FIG. 2 schematically illustrates the technical principle underlying the operation of the optical analyser of the adaptive optical system of FIG. 1.
Figure 3:
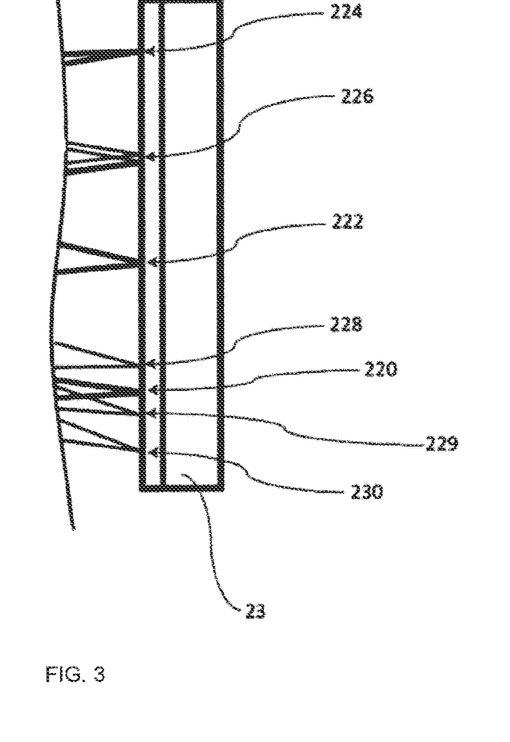
FIG. 3 is an enlarged view of a detail of the wavefront analyser schematically illustrated in FIG. 2.

Advantageously, the first reflective element 23 is consisted of a generally plane mirror, whereas the second reflective element 24 is also consisted by a mirror, which preferably has a slightly curved shape, with a concavity directed towards the first reflective element 23 as illustrated in FIG. 2.

In the embodiment illustrated in the Figures, the second reflective element 24 is provided with one or several passages 24A, 24B through its thickness to allow, respectively:
the incident radiation corresponding to the input light beam 7 to enter the multi-pass cavity 22, and/or
the elementary output light beams 80, 90, 100 to exit from said multi-pass cavity 22.

Such an arrangement provides the analyser 6 with a high compactness. It is however perfectly conceivable, without thereby departing from the framework of the invention, that the second reflective element 24 has no passage and that the input light beam 7 and output light beams 80, 90, 100 enter the multi-pass cavity 22 and exit therefrom through the side, in accordance for example with the design illustrated by FIG. 5a in document WO-2019/162637, the content of which is incorporated herein by way of reference.

Advantageously, all the phase modification elements 25 are arranged only on the first reflective elements 23, at a distance from each other. In this case, only the first reflective element 23 forms an optical phase-shift device, whereas the second reflective element 24 acts only like a simple mirror that has preferably no phase-shift function. The invention is however not limited to this specific embodiment, and it is for example perfectly conceivable that the second reflective element 24 also fulfils an optical phase-shift function, alone or in combination with the first reflective element 23.

Figure 4:
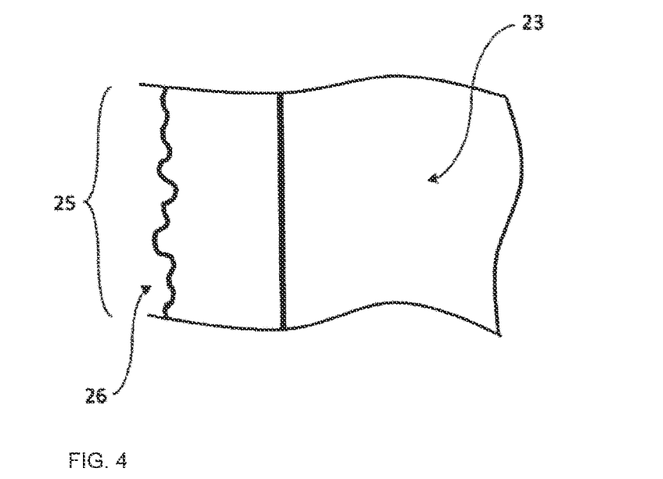
FIG. 4 is an enlarged view of a detail of FIG. 3.

Advantageously, and according to the embodiment illustrated in the Figures, each of the phase modification elements 25 is formed by a surface irregularity 26 of the concerned reflective element 23, as illustrated in FIG. 4. Particularly preferentially, said surface irregularities 26 are formed by a micropatterning of said concerned reflective element 23.

In this particularly advantageous embodiment, the multi-pass cavity 22 thus comprises a textured-surface mirror that forms the first reflective element 23, and another mirror, whose surface is on the contrary not textured (but could perfectly be, without departing from the scope of the invention), forming the second reflective element 24. The micropatterning of the surface is for example obtained by lithography, it being understood that the invention is absolutely not limited to a particular manufacturing method.

Finally, the operation of the optical analyser implemented within the framework of the advantageous embodiment illustrated in the Figures is based on a succession of reflections of the light beam 7 and of local phase-shifts of the latter, separated by non-guided free space propagations of the beam, in such a way that the light beam undergoes inside the multi-pass cavity 22 a succession of elementary transformations leading to its decomposition into multiple beams 80, 90, 100 each corresponding to a particular deformation mode. In other words, during its different reflection travels between the two reflective elements 23, 24 of the multi-pass cavity 22, the light beam meets different localised phase-shift areas inducing a respective elementary transformation of the spatial profile of the beam, the succession of these transformations induced by each phase-shift area leading to the desired demultiplexing.

The optical analyser 6 thus makes it possible to produce, by spatial demultiplexing, different elementary output light beams 80, 90, 100, the respective spatial profile of which corresponds to a given elementary optical aberration (for example, a given Zernike mode) and/or to a group of given elementary optical aberrations (wherein such a group may correspond for example to optical aberrations of the same order).

Advantageously, the adaptive optical system 1 comprises a device 27 for transforming each elementary output beam 80, 90, 100 into a respective electric signal, in such a way that said output signals 8, 9, 10 are electrical. For example, the transformation device 27 of each elementary beam 80, 90, 100 into a respective electric signal includes light sensors 27A, 27B, 27C, as for example photodiodes, charge-coupled device (CCD) detectors or CMOS sensors (for example, linear CMOS sensors) or also photomultipliers.

Thanks to the invention, it is therefore no longer necessary to integrate expensive and slow array imagers, and a single light flow sensor (a photodiode, for example) may be implemented, within the framework of an optimum design, for each degree of freedom. By way of comparison, a wavefront detector of the Shack-Hartmann type requires typically at least 36 pixels per degree of freedom.

In a particular embodiment, the deformable mirror that preferentially forms the adaptive optical device 2 is a modal deformable mirror, advantageously forming a modal wavefront corrector. Such a deformable mirror may be consisted for example by the modal deformable mirror sold under the name "ALPAO—DMM" by the French-law company ALPAO—727, Rue Aristide Bergès—38330 Montbonnot—France. Such a modal deformable mirror makes it possible to correct or generate, in an extremely simple and rapid manner, the most common optical aberrations. Each control channel of a modal deformable mirror thus advantageously corresponds to a predetermined spatial mode (for example, a Zernike mode). The driving device 5, which advantageously includes a plurality of actuators 50, 51, 52, 53, 54, 55, 56, 57, is then, in this case, advantageously designed to deform the deformable reflective surface advantageously forming the optical processing surface 3 according to different Zernike modes. A modal deformable mirror is thus advantageously based on a modal control, according to which the wavefront is expressed as a combination of elementary modes (Zernike modes) which corresponds as closely as possible to the wavefront deformation introduced by the atmospheric disturbances. The invention is however not limited to the implementation of a modal deformable mirror, and excellent results are obtained for example with a very short response time deformable mirror that allows taking best advantage of the modal demultiplexing performed by the analyser 6, as for example the deformable mirror sold under the name "DM 97-15" by the above-mentioned ALPAO company.

Particularly advantageously, the Zernike modes of said modal deformable mirror forming preferentially the adaptive optical device 2 correspond to said isolated modes of said elementary light beams 80, 90, 100 produced by the optical analyser 6. In this preferential embodiment, the control device 11 may be extremely simple and fast, or even consist simply of a single analog amplifier per mode. It is thus possible to completely dispense with a calculator and to carry out a wavefront reconstruction that is purely analog. However, the use of a control device 11 using digital electronic is particularly useful for its ease of setup and its low cost. The control device 11 thus advantageously includes at least one digital signal processor (DSP). But the performance of the system 1, in particular the correction bandwidth, won't be limited, as in the prior art, by the speed of the wavefront detector and/or of the calculator.

Therefore, in this advantageous embodiment, the invention is particularly adapted to the applications related to by the correction of atmospheric disturbances or turbulences, and in particular applications for which:
the number of modes to be corrected is low (telecommunications, imaging with about 1-metre-size telescopes, fiber-optics injection . . . ),
the cost, the robustness and/or the compactness are critical,
the speed of correction is critical (satellite or debris imaging, etc.).

Advantageously, the adaptive optical device 2, which is preferentially consisted by a deformable mirror, and even more preferentially by a modal or short response time deformable mirror, comprises a deformable plate forming said optical processing surface 3. The deformable plate 30 has an exposed face 30A and a hidden face 30B, the exposed face 30A advantageously forming a reflective face when the adaptive optical device 2 is formed by a deformable mirror, as illustrated. Advantageously, the adaptive optical device 2 also comprises tabs 40, 41, 42, 43, 44, 45, 46, 47 fixedly attached to said deformable plate 30. Advantageously, the tabs 40, 41, 42, 43, 44, 45, 46, 47 are integral with the deformable plate 30, in such a way that said tabs 40, 41, 42, 43, 44, 45, 46, 47 and the deformable plate 30 form a single-piece, unitary sub-set. The invention is obviously not limited to this specific embodiment and the tabs 40, 41, 42, 43, 44, 45, 46, 47 can perfectly be consisted of distinct parts assembled (for example by bonding or any other means) to the deformable plate 30.

Advantageously, each tab 40, 41, 42, 43, 44, 45, 46, 47 extends radially, from the deformable plate 30, according to a uniform angular distribution. It is however possible to provide an irregular angular distribution. The number of tabs

40, 41, 42, 43, 44, 45, 46, 47 can also be adjusted in such a way that the invention is not limited to the implementation of eight tabs as illustrated by way of example in the Figures. Advantageously, the deformable plate 30 and the tabs 40, 41, 42, 43, 44, 45, 46, 47 attached to the latter form together a single-piece deformable body having the shape of a multi-arm star, each arm being formed by one of said tabs 40, 41, 42, 43, 44, 45, 46, 47.

Figure 5:
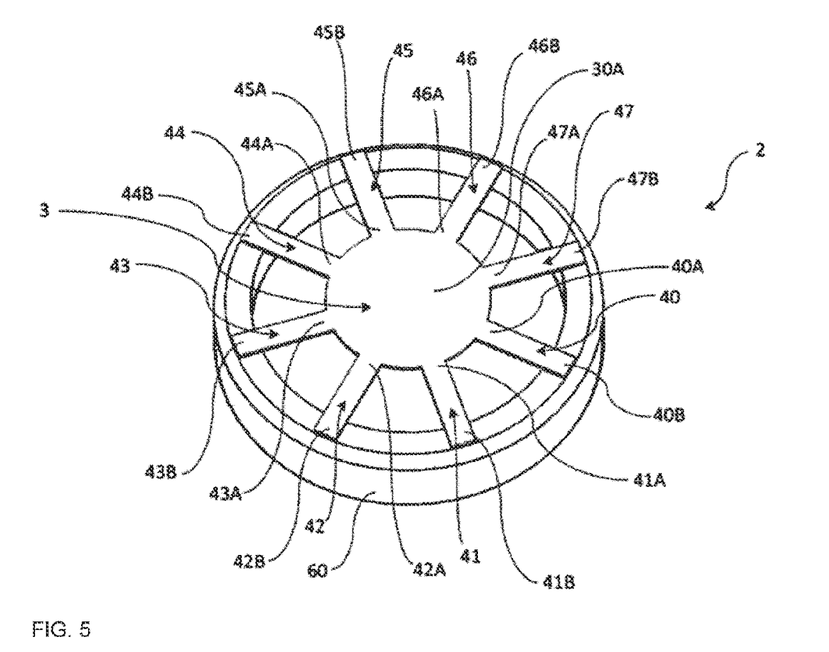
FIG. 5 illustrates, in a schematic perspective top view, a modal deformable mirror that may advantageously be implemented in the adaptive optical system of FIG. 1.
Figure 6:
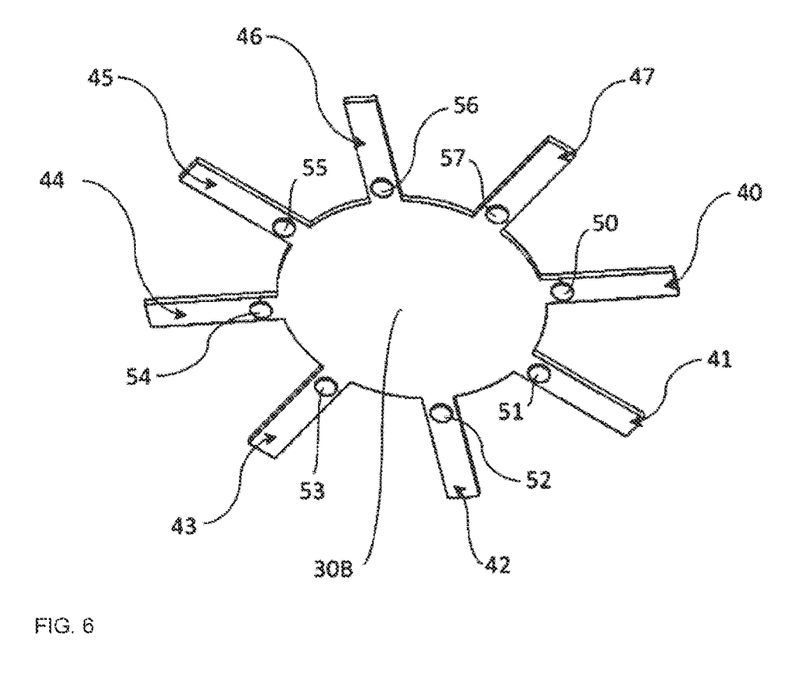
FIG. 6 illustrates, in a schematic perspective bottom view, a detail of the deformable mirror of FIG. 5.

Advantageously, and as illustrated in the Figures, the adaptive optical device 2 comprises a fixed frame 60 to which the deformable plate 30 forming the optical processing surface 3 is attached while being capable of moving locally with respect to said fixed frame 60, under the effect of the deformations it undergoes in response to the controlled mechanical stresses exerted by the actuators 50, 51, 52, 53, 54, 55, 56, 57 of the driving device 5. Advantageously, each tab 40, 41, 42, 43, 44, 45, 46, 47 comprises a respective movable part 40A, 41A, 42A, 43A, 44A, 45A, 46A, 47A connected to at least one of said actuators 50, 51, 52, 53, 54, 55, 56, 57 in such a way that the latter can deform locally said tab 40, 41, 42, 43, 44, 45, 46, 47 for the latter to transmit a deformation force to the deformable plate 30. Each tab 40, 41, 42, 43, 44, 45, 46, 47 advantageously also comprises a respective fixed part 40B, 41B, 42B, 43B, 44B, 45B, 46B, 47B that is fixedly attached to said frame 60 in order to be immobilized with respect to the latter. Each actuator 50, 51, 52, 53, 54, 55, 56, 57 may for example be of the magnetic type, in two parts, with a movable part (visible in FIG. 6) attached to the corresponding tab 40, 41, 42, 43, 44, 45, 46, 47 and a fixed part integral with the frame 60. Said frame 60 is advantageously in the form of a rigid single-piece ring (cf. FIG. 5), to which are attached the fixed parts 40B, 41B, 42B, 43B, 44B, 45B, 46B, 47B of the tabs 40, 41, 42, 43, 44, 45, 46, 47.

Such a design makes it possible to obtain a modal deformable mirror that is particularly simple, reliable and robust, which is particularly suitable for a modal control and which is hence perfectly adapted to be used in conjunction with an optical analyser 6 based on the MPLC technology, such as that described hereinabove.

It is also conceivable, according to a non-illustrated embodiment, that at least one of the actuators of the driving device 5 is designed to apply a force directly on the deformable plate 30, for example at the geometric centre thereof, to deform it. The implementation of such a central actuator to deform the deformable plate 30 directly at the centre thereof, in conjunction with the other actuators 50, 51, 52, 53, 54, 55, 56, 57 arranged on the movable part of each tab 40, 41, 42, 43, 44, 45, 46, 47, makes it possible to carry out a particularly efficient modal control to obtain simply and rapidly a multitude of Zernike modes.

Therefore, in a particularly advantageous embodiment, the adaptive optical system 1 uses the "multiplexing division mode" principles to decompose a wavefront into deformation modes (for example, Zernike modes), and to therefore translate each light deformation mode into a light signal 8, 9, 10 that is used to command the controlled modification of the optical behaviour of a modal adaptive optical device 2, such as a modal deformable mirror as mentioned hereinabove. The invention thus corresponds in a way to the application to adaptive optics of technical principles up to now related to fiber-optics, to free from the response times associated with the conventionally used wavefront detectors, such as the Shack-Hartmann detectors.

The invention moreover also relates, according to a second aspect, to the new use of an optical analyser 6 designed to spatially demultiplex, by multi-plane light conversion, an input light beam 7 into a plurality of elementary output light beams 80, 90, 100, each corresponding to an isolated spatial mode or to a group of isolated spatial modes, to provide signals 8, 9, 10 for driving the modification of optical behaviour of an optical processing surface 3 of an adaptive optical device 2 intended to controllably deform an incident wavefront 4. The signals 8, 9, 10 serve for example to drive the deformation of a deformable reflective surface of a deformable mirror, which may be a modal deformable mirror. For example, the optical analyser 6 may be designed on the basis of the PROTEUS-S device, or the PROTEUS-C device, or the TILBA-R device, all marketed by the French-law company CAILABS—38, Boulevard Albert 1er, 35200 Rennes—France. The invention is however not limited to the implementation of a specific design of optical analyser, and any other MPLC demultiplexing device may be used without thereby departing from the scope of the invention.

Finally, the invention also relates as such to a method of driving an adaptive optical device 2, which device 2 advantageously corresponds to that described hereinabove and therefore comprises an optical processing surface 3 (which is advantageously a deformable surface) intended to deform an incident wavefront 4 and a driving device 5 connected to said optical processing surface 3 to controllably modify the optical behaviour of said optical processing surface 3. In the example illustrated in the Figures, the driving device 5 (which advantageously comprises the actuators 50, 51, 52, 53, 54, 55, 56, 57) is connected to the deformable surface that advantageously forms the optical processing surface 3, to controllably deform said optical processing surface 3. The driving method is hence advantageously implemented by the adaptive optical system 1 described hereinabove, in such a way that the above-mentioned adaptive optical system 1 also applies to the driving method. Conversely, the following description of the driving method also advantageously applies to the above-described adaptive optical system 1.

The method according to the invention comprises a step of subjecting an optical analyser 6 to an input light beam 7 in order to produce, in response, output signals 8, 9, 10. The method also comprises a step of commanding the driving device 5 as a function of the output signals 8, 9, 10. According to the invention, the optical analyser 6 spatially demultiplexes, by multi-plane light conversion (MPLC), the input light beam 7 into a plurality of elementary output light beams 80, 90, 100, each corresponding to an isolated spatial mode or to a group of isolated spatial modes, said output signals 8, 9, 10 being formed by, or from, said elementary light beams 80, 90, 100, as explained hereinabove in relation with system 1.

Finally, the system, use and method according to the invention makes it possible to cost-effectively correct a disturbed wavefront, in a particularly fast and reliable manner, including when the useful signal is very low.

POSSIBILITY OF INDUSTRIAL APPLICATION

The invention finds its industrial application in the design, manufacture and use of adaptive optical systems.

The invention claimed is:
1. An adaptive optical system (1) comprising:
an adaptive optical device (2) comprising an optical processing surface (3) intended to deform an incident wavefront (4) and a driving device (5) connected to said optical processing surface (3) to controllably modify the optical behaviour of said optical processing surface (3), an optical analyser (6) intended to be subjected to an input light beam (7) in order to produce, in response, output signals (8, 9, 10), a control device (11) connected, on the one hand, to the optical analyser (6), and on the other hand, to the driving device (5), in order to command the latter as a function of said output signals (8, 9, 10), characterized in that said optical analyser (6) is designed to spatially demultiplex, by multi-plane light conversion, the input light beam (7) into a plurality of elementary output light beams (80, 90, 100) each corresponding to an isolated spatial mode or to a group of isolated spatial modes, said output signals (8, 9, 10) being formed by, or from, said elementary light beams (80, 90, 100).

2. The adaptive optical system (1) according to claim 1, characterized in that said optical analyser (6) comprises a multi-pass cavity (22) delimited by first and second reflective elements (23, 24) on each of which said input light beam (7) is intended to reflect a plurality of times at a plurality of different reflection locations (220, 221, 222, 223, 224, 225, 226, 227, 228, 229, 230), at least certain of said reflection locations (220, 221, 222, 223, 224, 225, 226, 227, 228, 229, 230) each being provided with a phase modification element (25), to modify the spatial phase of the light beam.

3. The adaptive optical system (1) according to claim 2, characterized in that the phase modification elements (25) are formed by a passive phase-shift structure whose conformation is fixed.

4. The adaptive optical system (1) according to claim 2, characterized in that said first and second reflective elements (23, 24) are fixed and passive.

5. The adaptive optical system (1) according to claim 2, characterized in that each of said phase modification elements (25) is formed by a surface irregularity (26) of the concerned reflective element (23).

6. The adaptive optical system (1) according to claim 5, characterized in that said surface irregularities (26) are formed by a micro-patterning of said surface.

7. The adaptive optical system (1) according to claim 2, characterized in that all the phase modification elements (25) are arranged only on the first reflective elements (23), at a distance from each other.

8. The adaptive optical system (1) according to claim 1, characterized in that said adaptive optical device (2) is a deformable mirror provided with a deformable reflecting surface forming said optical processing surface (3).

9. The adaptive optical system (1) according to claim 8, characterized in that said deformable mirror is a modal deformable mirror whose driving device (5) is designed to deform said deformable reflective surface according to different Zernike modes.

10. The adaptive optical system (1) according to claim 9, characterized in that said Zernike modes of said modal deformable mirror correspond to said isolated modes of said elementary light beams (8, 9, 10).

11. The adaptive optical system (1) according to claim 1, characterized in that said driving device (5) comprises a plurality of actuators (50, 51, 52, 53, 54, 55, 56, 57) spaced apart from each other, said control device providing each actuator with a respective electrical command signal that depends of said output signals.

12. The adaptive optical system (1) according to claim 11, characterized in that said adaptive optical device (2) comprises a deformable plate (30) forming said optical processing surface (3), tabs (40, 41, 42, 43, 44, 45, 46, 47) fixedly attached to said deformable plate (30), as well a fixed frame (60), each tab (40, 41, 42, 43, 44, 45, 46, 47) comprising a movable part (40A, 41A, 42A, 43A, 44A, 45A, 46A, 47A) connected to at least one of said actuators (50, 51, 52, 53, 54, 55, 56, 57, 58) in such a way that the latter can deform locally said tab (40, 41, 42, 43, 44, 45, 46, 47) for the latter to transmit a deformation force to said deformable plate (30), each tab further comprising a fixed part (40B, 41B, 42B, 43B, 44B, 45B, 46B, 47B) that is fixedly attached to said frame (60) in order to be immobilized with respect to the latter.

13. The adaptive optical system (1) according to claim 12, characterized in that said deformable plate (30) and said tabs (40, 41, 42, 43, 44, 45, 46, 47) attached to the latter form together a single-piece deformable body having the shape of a multi-arm star, each arm being formed by one of said tabs (40, 41, 42, 43, 44, 45, 46, 47).

14. The adaptive optical system (1) according to claim 12, characterized in that at least one of said actuators is designed to apply a force directly on said deformable plate (30), for example at the geometric centre thereof, to deform it.

15. The adaptive optical system (1) according to claim 12, characterized in that each tab (40, 41, 42, 43, 44, 45, 46, 47) extends radially, from said deformable plate (30), according to a uniform angular distribution.

16. The adaptive optical system (1) according to claim 12, characterized in that said tabs (40, 41, 42, 43, 44, 45, 46, 47) are integral with said deformable plate (30).

17. The adaptive optical system (1) according to claim 1, characterized in that it comprises a device (27) for transforming each elementary beam (80, 90, 100) into a respective electric signal, in such a way that said output signals (80, 90, 100) are electrical.

18. The adaptive optical system according to claim 17, characterized in that said device (27) for transforming each elementary beam (80, 90, 100) into a respective electric signal includes light sensors, as for example photodiodes, charge-coupled device (CCD) sensors or CMOS sensors.

19. The adaptive optical system (1) according to claim 1, characterized in that said control device (11) includes at least one digital signal processor.

20. The adaptive optical system (1) according to claim 1, characterized in that it comprises a beam splitter (13) arranged with respect to the adaptive optical device (2) and the optical analyser (6) in such a way that an incident light beam (12) is reflected and/or refracted by the optical processing surface (3) of the adaptive optical device (2) to form a modified light beam (14) sent back to said splitter, which splits the modified light beam (14) into a first beam (15) forming said input light beam (7) and a second beam (16) to be exploited.

21. The adaptive optical system (1) according to claim 20, characterized in that said beam splitter (13) is chromatic, in such a way that said first beam is formed by a radiation whose spectral band is different from that of the radiation forming the second beam (16).

22. Use of an optical analyser (6) designed to spatially demultiplex, by multi-plane light conversion, an input light beam (7) into a plurality of elementary output light beams (80, 90, 100) each corresponding to an isolated spatial mode or to a group of isolated spatial modes, to provide signals (8, 9, 10) for driving the modification of optical behaviour of an optical processing surface (3) of an adaptive optical device (2) intended to controllably deform an incident wavefront (4).

23. A method for driving an adaptive optical device (2) comprising an optical processing surface (3) intended to deform an incident wavefront (4) and a driving device (5)

connected to said optical processing surface (3) to controllably modify the optical behaviour of said optical processing surface (3), said method comprising a step of subjecting an optical analyser (6) to an input light beam (7) in order to produce, in response, output signals (8, 9, 10), as well as a step of commanding the driving device (5) as a function of said output signals (8, 9, 10), said method being characterized in that said optical analyser (6) spatially demultiplex, by multi-plane light conversion, the input light beam (7) into a plurality of elementary output light beams (80, 90, 100) each corresponding to an isolated spatial mode or to a group of isolated spatial modes, said output signals (8, 9, 10) being formed by, or from, said elementary light beams (80, 90, 100).

* * * * *